(12) United States Patent
M'Saoubi et al.

(10) Patent No.: US 12,280,434 B2
(45) Date of Patent: Apr. 22, 2025

(54) CUTTING INSERT

(71) Applicant: SECO TOOLS AB, Fagersta (SE)

(72) Inventors: Rachid M'Saoubi, Fagersta (SE);
Zhirong Liao, Nottingham (GB);
Jimmy Thelin, Fagersta (SE); Dragos Axinte, Nottingham (GB)

(73) Assignee: Seco Tools AB, Fagersta (SE)

( * ) Notice: Subject to any disclaimer, the term of this patent is extended or adjusted under 35 U.S.C. 154(b) by 379 days.

(21) Appl. No.: 17/792,910

(22) PCT Filed: Jan. 8, 2021

(86) PCT No.: PCT/EP2021/050255
§ 371 (c)(1),
(2) Date: Jul. 14, 2022

(87) PCT Pub. No.: WO2021/144199
PCT Pub. Date: Jul. 22, 2021

(65) Prior Publication Data
US 2023/0067286 A1    Mar. 2, 2023

(30) Foreign Application Priority Data

Jan. 17, 2020 (EP) ..................... 20152353

(51) Int. Cl.
B23C 5/28     (2006.01)
B23B 27/10    (2006.01)
B23B 27/16    (2006.01)

(52) U.S. Cl.
CPC .... *B23B 27/1603* (2013.01); *B23B 2200/086* (2013.01); *B23B 2250/12* (2013.01); *B23B 2260/072* (2013.01); *B23C 5/28* (2013.01)

(58) Field of Classification Search
CPC .......... B23B 27/1603; B23B 2260/072; B23B 2200/086; B23B 2250/12; B23B 27/10;
(Continued)

(56) References Cited

U.S. PATENT DOCUMENTS 3,395,434 A * 8/1968 Wirfelt ................. C08F 136/06
407/114
3,889,520 A * 6/1975 Stoferle ............ B23Q 17/0928
73/104
(Continued)

FOREIGN PATENT DOCUMENTS

DE         3004166 A * 8/1980  ............. B23B 27/10
DE   102013210355 A1 * 12/2014 ................ B22F 3/10
(Continued)

OTHER PUBLICATIONS

Hoier P et al. "Characterization of tool wear when machining alloy 718 with high-pressure cooling using conventional and surface-modified WC-Co tools", Journal of Superhard Materials, Allerton Press, New York, NY, US, vol. 39, No. 3, Jun. 23, 2017, pp. 178-185.

*Primary Examiner* — Sara Addisu
(74) *Attorney, Agent, or Firm* — Corinne R. Gorski

(57) ABSTRACT

A cutting insert for a cutting tool includes a body having a cutting edge, a rake face, and micro channels provided on the rake face adjacent the cutting edge. The micro channels define a grid pattern of micro channels that intersect each other in a region of the rake face where contact between a chip and the rake face is assumed to occur during cutting with the cutting insert.

14 Claims, 3 Drawing Sheets

(58) Field of Classification Search
CPC ... B23B 27/1611; B23C 2250/12; B23C 5/28; B23C 2200/086; B23C 5/202
See application file for complete search history.

(56) References Cited

U.S. PATENT DOCUMENTS

| | | | | |
|---|---|---|---|---|
| 4,535,216 A * | 8/1985 | Cassidenti | ............... | B23B 27/10 82/51 |
| 4,616,963 A * | 10/1986 | Habert | ................... | B23B 27/22 407/116 |
| 4,629,372 A * | 12/1986 | Huston | ................. | B23B 27/143 407/116 |
| 5,237,894 A * | 8/1993 | Lindeke | ............. | B23Q 11/1084 82/900 |
| 5,346,335 A * | 9/1994 | Harpaz | ................ | B23Q 1/0018 82/52 |
| 5,439,327 A * | 8/1995 | Wertheim | ............ | B23Q 1/0036 407/113 |
| 5,525,016 A * | 6/1996 | Paya | ..................... | B23B 27/141 407/116 |
| 5,626,189 A * | 5/1997 | Hutchinson | ........... | E21B 29/002 166/55.6 |
| 5,688,081 A * | 11/1997 | Paya | ..................... | B23B 27/141 407/115 |
| 5,788,427 A * | 8/1998 | Zitzlaff | ................. | B23B 27/141 407/115 |
| 5,901,623 A * | 5/1999 | Hong | ................. | B23Q 11/1053 407/100 |
| 6,053,669 A * | 4/2000 | Lagerberg | ............... | B23B 27/10 407/120 |
| 6,447,218 B1 * | 9/2002 | Lagerberg | ............... | B23B 27/10 407/115 |
| 6,599,061 B1 * | 7/2003 | Nelson | ................... | B23B 27/143 407/115 |
| 6,932,545 B2 * | 8/2005 | Vanberg | ................ | B23B 27/143 407/115 |
| 7,396,191 B2 | 7/2008 | Fujimoto et al. | | |
| 7,419,336 B2 * | 9/2008 | Lehto | .................... | B23C 5/1045 407/42 |
| 7,802,947 B2 * | 9/2010 | Endres | ................. | B23B 27/145 407/115 |
| 7,955,032 B2 * | 6/2011 | Nelson | ..................... | B23C 5/28 407/113 |
| 8,500,376 B2 * | 8/2013 | Koerner | ............. | B23B 27/1607 407/113 |
| 9,302,326 B2 * | 4/2016 | Höfermann | ......... | B23B 27/1614 |
| 9,649,692 B2 * | 5/2017 | Okamura | ............... | B23B 27/145 |
| 10,005,144 B2 * | 6/2018 | El-Wardany | ............ | B23P 15/42 |
| 10,632,542 B2 * | 4/2020 | Harada | ................ | B23K 26/355 |
| 2002/0106250 A1 * | 8/2002 | Murakawa | ................ | B23C 5/28 82/900 |
| 2004/0240949 A1 * | 12/2004 | Pachao-Morbitzer | ....................... | B23B 27/065 407/115 |
| 2007/0006694 A1 * | 1/2007 | Fujimoto | ................ | B23B 27/10 82/900 |
| 2007/0077130 A1 * | 4/2007 | Ley | ..................... | B23B 27/1607 407/114 |
| 2007/0258778 A1 * | 11/2007 | Waggle | ................... | B23C 5/202 407/113 |
| 2008/0279644 A1 * | 11/2008 | Endres | ................... | B23B 27/10 408/59 |
| 2009/0320655 A1 * | 12/2009 | Grant | ..................... | B23B 29/04 29/564 |
| 2011/0222974 A1 * | 9/2011 | Park | ...................... | B23B 27/141 82/1.11 |
| 2012/0082518 A1 * | 4/2012 | Woodruff | ............... | B23P 15/34 76/115 |
| 2015/0321262 A1 * | 11/2015 | Kondameedi | ......... | B23B 27/145 407/115 |
| 2016/0151871 A1 * | 6/2016 | Grant | ................. | B23Q 11/1061 29/557 |
| 2016/0158855 A1 * | 6/2016 | Kondameedi | ............ | B23C 5/28 407/11 |
| 2021/0114117 A1 * | 4/2021 | Harada | ................ | B23B 27/145 |
| 2023/0158577 A1 * | 5/2023 | Larsson | .................. | B22F 10/20 407/11 |
| 2024/0116113 A1 * | 4/2024 | Hasegawa | ............ | B23B 27/145 |
| 2024/0300028 A1 * | 9/2024 | Yamaguchi | ............. | B23B 27/10 |

FOREIGN PATENT DOCUMENTS

| | | | | |
|---|---|---|---|---|
| EP | 0507250 A1 | | 10/1992 | |
| EP | 2376251 B1 | | 4/2016 | |
| FR | 2244590 A | * | 5/1975 | ............ B23B 27/10 |
| JP | 56069007 A | * | 6/1981 | |
| JP | 60127904 A | * | 7/1985 | |
| JP | 05301104 A | * | 11/1993 | |
| JP | 08025111 A | * | 1/1996 | |
| JP | 08039387 A | * | 2/1996 | |
| JP | 2009113120 A | * | 5/2009 | ............ B23C 5/06 |
| WO | 99/39853 A1 | | 8/1999 | |
| WO | 2006007607 A1 | | 1/2006 | |
| WO | 2007099777 A1 | | 9/2007 | |

\* cited by examiner

CUTTING INSERT

RELATED APPLICATION DATA

This Application is a § 371 National Stage Application of PCT International Application No. PCT/EP2021/050255 filed Jan. 8, 2021 with priority to EP 20152353.7 filed Jan. 17, 2020.

TECHNICAL FIELD

The present invention relates to a cutting insert for a cutting tool, comprising a body having a cutting edge, a rake face and micro channels, provided on said rake face adjacent the cutting edge.

BACKGROUND

Enhanced cooling performance of a cutting tool can be achieved by delivery of coolant as close as possible to the cutting edge. A number of cooling systems (e.g. Seco Jetstream) are available on the market today where cutting fluid delivery is supplied through the tool holder/coolant nozzles at high pressure. Such systems offer clear benefit in enhancing chip control (e.g. by breaking the chip in smaller fragments) in roughing/medium machining operations. However, in the context of finishing operations (small feed/small depth of cut), their cooling impact appears limited due to the inability of the cutting fluid to access the zone of intimate contact between the chip and rake surface.

It is therefore an objective of the present intention to seek to provide means of enhancing the cooling effect of a cutting insert and at the same time lubricate the tool-chip contact in order to reduce friction forces between the cutting insert and the chip.

SUMMARY

The objective of the invention is achieved by means of a cutting insert for a cutting tool, comprising a body having:
a cutting edge,
a rake face, and
micro channels, provided on said rake face adjacent the cutting edge, the cutting insert being characterized in that the micro channels define a grid pattern of micro channels that intersect each other in a region of the rake face where contact between a chip and the rake face is assumed to occur during cutting with the cutting insert.

Provided that a fluid such as a cooling liquid, can be introduced into the micro channels, the grid pattern of micro channels will efficiently form a cushion on which the chip will slide with reduced friction and improved cooling.

The cutting insert may be of any type, such as inedexable cutting insert, with any suitable geometry, such as round, triangular, or tetrahedral. Preferably the cutting insert is a cutting insert configured for the cutting of metals.

According to embodiments in which a chip breaker is provided on the rake face, the grid pattern of micro channels is provided between the cutting edge and the chip breaker. The chip breaker may be any irregularity, such as a heel, a groove or a protrusion on the rake face configured to promote chip-breaking or at least acting as a means of preventing further continuous contact between the chip rake face.

According to one embodiment, the micro channels comprise at least two micro channels extending in a first direction and at least two micro channels extending in a second direction and intersecting the micro channels extending in the first direction.

According to one embodiment, the first direction is perpendicular to the second direction.

According to one embodiment, the first direction is parallel with the adjacent cutting edge.

According to one embodiment, each micro channel has a width W in the range of 20-1000 µm.

According to one embodiment, each micro channel has a width W of at least 50 µm.

According to one embodiment, each micro channel has a width W of 200 µm or less.

According to one embodiment, each micro channel has a depth D in the range of 20-1000 µm.

According to one embodiment, each micro channel has a depth D of at least 50 µm.

According to one embodiment, each micro channel has a depth D of 200 µm or less.

According to one embodiment, the distance between neighboring micro channels that do not intersect each other is at least 1.5 times the width W of the respective micro channel. Thereby, sufficient mechanical strength of portions between the micro channels is guaranteed.

According to one embodiment, the micro channels are at a distance k1 of 200 µm to 3 mm from the cutting edge. If the micro channels are too close to the cutting edge, they may affect the mechanical strength of the cutting edge negatively.

According to one embodiment, an intersection of the micro channels are located at a distance k2 in the range of k1 to k1+0.5 mm from the cutting edge.

According to one embodiment, the cutting insert comprises cooling channels provided inside said body, said cooling channels being configured to be connected to a cooling medium source, wherein the cooling channels have outlets in the region of the grid pattern defined by the micro channels. Thereby, cooling efficiency is improved, and the micro channels may be efficiently filled with a cooling fluid acting as a cooling cushion for a chip to slide on.

The suggested combination of micro channels and cooling channels that deliver cooling fluid results in positive effects on cutting force and specific energy, which can be reduced significantly, beneficiating from both shearing and friction reduction. A reduced chip-tool contact area has been observed, especially on diminishing the sticking wear with a decreased friction coefficient. Studied chip morphology shows an improved fragmentation and evacuation phenomenon of inserts on which the invention is implemented while a reduced adiabatic shearing effect has been achieved due to the reduction of heat.

According to one embodiment, the outlets of the cooling channels have a diameter which is at least 3 times the width W of the micro channels.

BRIEF DESCRIPTION OF THE DRAWING

Embodiments of the invention will now be described in detail with regard to the annexed drawing, on which.

DETAILED DESCRIPTION OF EMBODIMENTS

Figure 1:
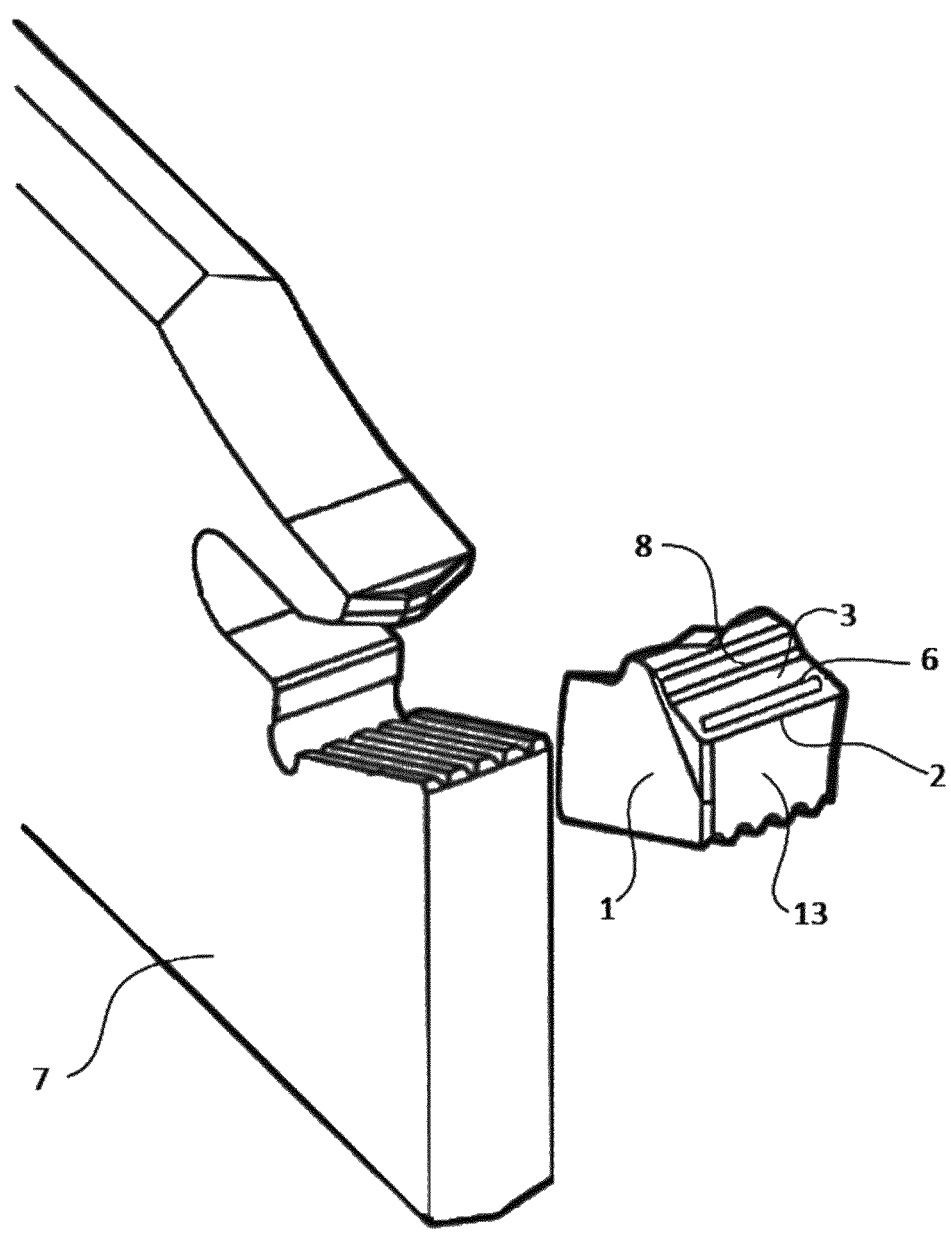
FIG. 1 is a perspective view of a cutting insert according to the invention, and a tool holder.
Figure 2:
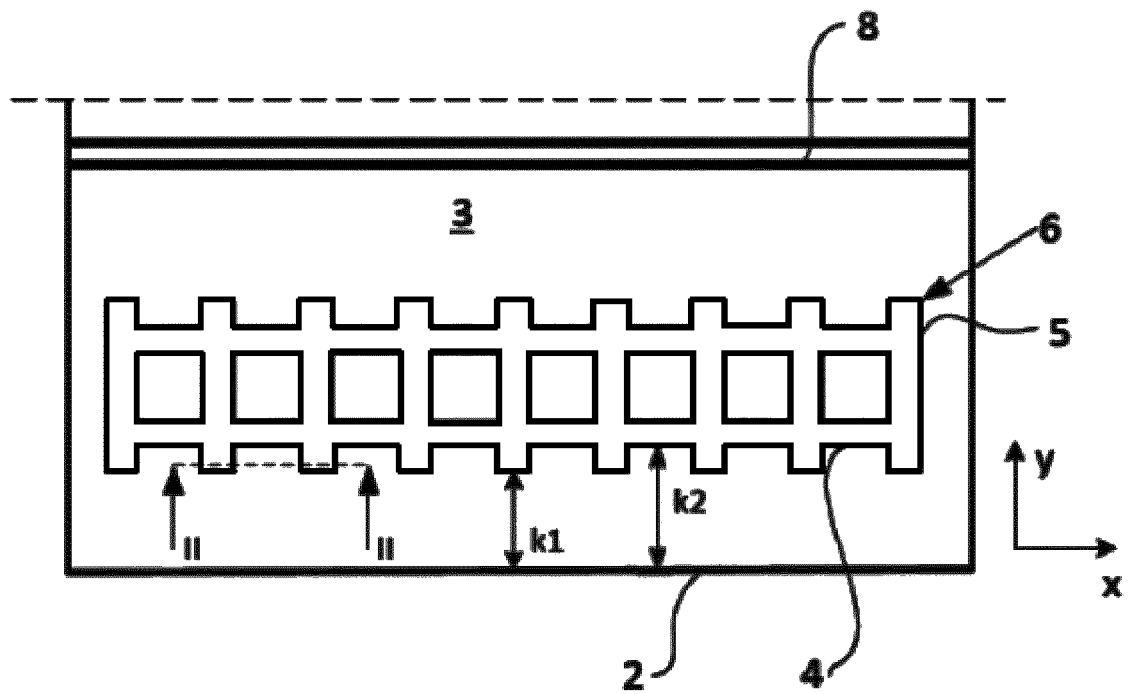
FIG. 2 is a planar view from above of a part of the cutting insert shown in FIG. 1.

Reference is made to FIGS. 1 and 2, showing a cutting insert for a cutting tool, said cutting insert comprising a body 1 having a cutting edge 2, a rake face 3, and micro channels 4, 5 provided on said rake face 3 adjacent the cutting edge 2. The micro channels 4, 5 define a grid pattern, indicated with reference number 6 in FIG. 1. The micro channels 4, 5 intersect each other and form the grid pattern 6 in a region of the rake face 3 where contact between a chip and the rake face 3 is assumed to occur during cutting with the cutting insert. The cutting insert is particularly configured for the cutting of metals. FIG. 1 also shows tool holder 7 configured to hold the cutting insert during operation.

The grid pattern 6 formed by the micro channels 4, 5 is located between the cutting edge 2 and a chip breaker 8 provided on the rake face 3.

The micro channels 4, 5 comprise at least two micro channels 4 extending in a first direction x and at least two micro channels 5 extending in a second direction y, intersecting the micro channels 4 extending in the first direction x. In the shown embodiment, the first direction x is perpendicular to the second direction y. However, the first direction x is not limited to this orientation. In the shown embodiment, the first direction x is parallel with the adjacent cutting edge 2.

Figure 3:
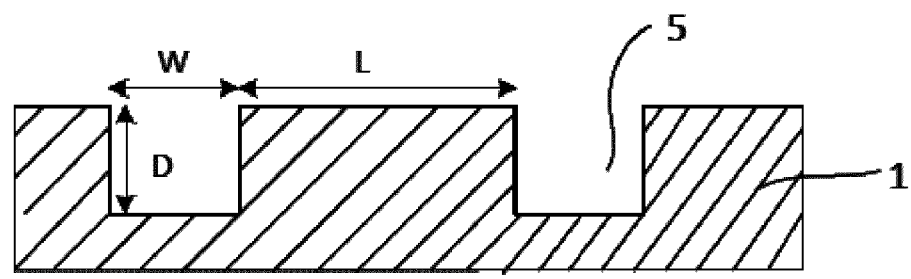
FIG. 3 is a cross section according to II-II in FIG. 2.

With reference to FIG. 3, each channel 4, 5 has a width W of approximately 100 μm, and a depth D of approximately 100 μm. The distance L between neighboring micro channels 4, 5 that do not intersect each other, i.e. parallel channels extending in the same direction, is approximately 150 μm.

The micro channels 5 closest to the cutting edge 2 are at a distance k1 from the cutting edge 2 of approximately 300 μm. In the shown embodiment, these micro channels 5 extend in the second direction y, which is perpendicular to the cutting edge 2. However, the invention does not exclude that it is a micro channel 4 extending in parallel with the cutting edge 2 which is closest to the cutting edge 2. In the shown embodiment, the intersection closest to the cutting edge is located at a distance k2 from the adjacent cutting edge of approximately 400 μm. In the shown embodiment, the remote opposite end of the grid pattern is located at a distance of approximately 2 mm from the cutting edge. However, the remote opposite end of the grid pattern can be located at a distance of the total length of the rake face 3. In other words, there is no limitation in the distance between the cutting edge 2 and the remote opposite end of the grid pattern.

Figure 4:
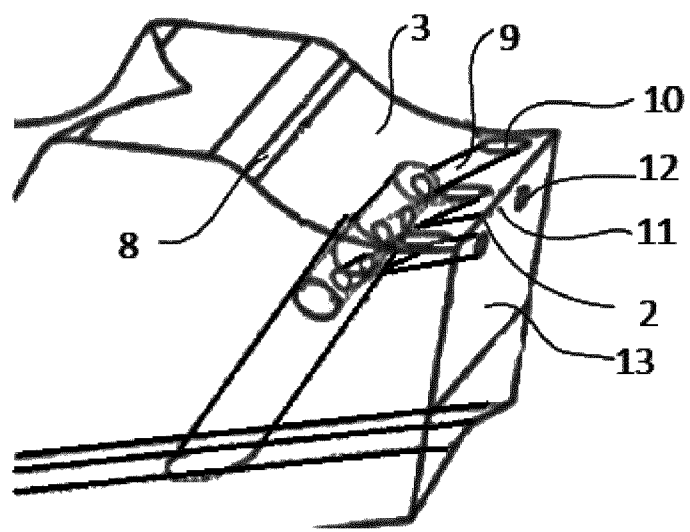
FIG. 4 is a perspective view of an alternative embodiment of a cutting insert according to the invention.
Figure 5:
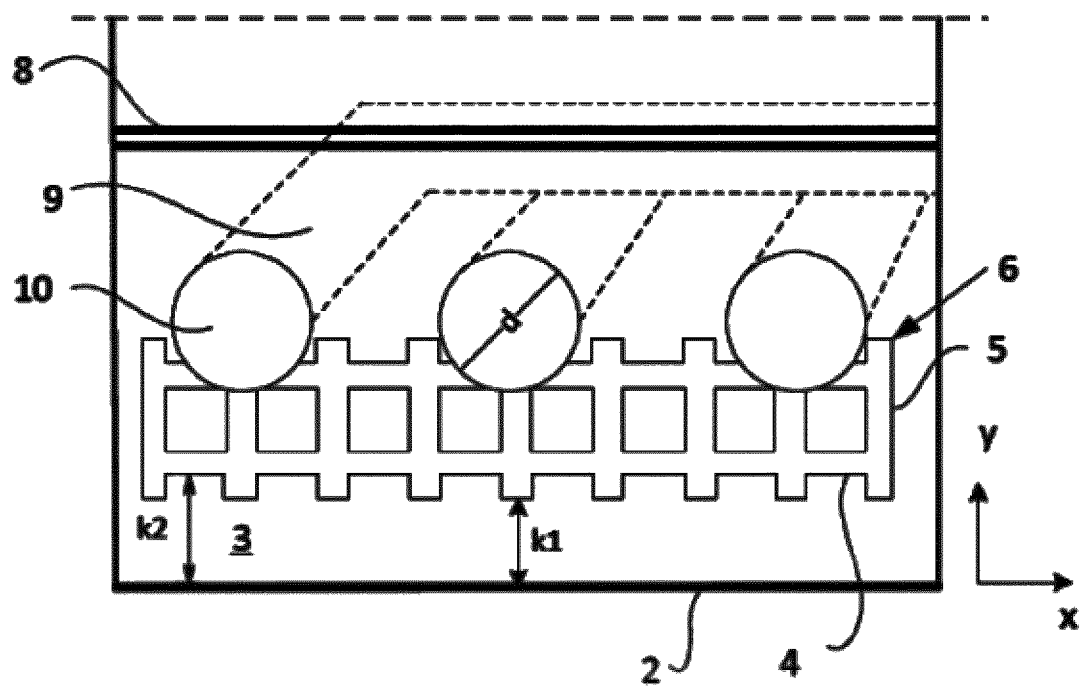
FIG. 5 is a planar view from above of a part of the cutting insert shown in FIG. 4.

Reference is made to FIGS. 4 and 5, which show an alternative embodiment. In this embodiment, the cutting insert further comprises cooling channels 9 provided inside said body 1. The cooling channels 9 are configured to be connected to a cooling medium source, such as a water distribution conduit arranged in the tool holder 7. The cooling channels 9 have outlets 10 in the region of the grid pattern 6 defined by the micro channels 4, 5.

Each of the outlets 10 of the cooling channels 9 has a diameter d which is at least 3 times the width W of the micro channels 4, 5.

The cooling channels 9 also have branches 11, which have outlets 12 in a clearance face 13 of the cutting insert, adjacent the cutting edge 2.

The cooling channels 9 and their branches 11 have been drilled by electro discharge machining, EDM, while the micro channels 4, 5 have been generated by a picosecond pulse laser. Other suitable methods are, of course, also conceivable.

The micro channels 4, 5 could be generated either prior or after coating of the cutting insert.

The project leading to this application has received funding from the Clean Sky 2 Joint Undertaking under the European Union's Horizon 2020 research and innovation programme under grant agreement No 754807.

The invention claimed is:

1. A cutting insert for a cutting tool, comprising a body having:
   a cutting edge,
   a rake face,
   micro channels provided on said rake face adjacent the cutting edge, wherein the micro channels define a grid pattern of micro channels that intersect each other in a region of the rake face, wherein contact between a chip and the rake face occurs during cutting with the cutting insert, and
   cooling channels provided inside the body, the cooling channels being configured to be connected to a cooling medium source, wherein the cooling channels have outlets in a region of the grid pattern defined by the micro channels.

2. The cutting insert according to claim 1, wherein the micro channels comprises at least two micro channels extending in a first direction and at least two micro channels extending in a second direction and intersecting the micro channels extending in the first direction.

3. The cutting insert according to claim 2, wherein the first direction is perpendicular to the second direction.

4. The cutting insert according to claim 2, wherein that the first direction is parallel with the adjacent cutting edge.

5. The cutting insert according to claim 1, wherein each micro channel has a width in the range of 20-1000 μm.

6. The cutting insert according to claim 1, wherein each micro channel has a width of at least 50 μm.

7. The cutting insert according to claim 1, wherein each micro channel has a width of 200 μm or less.

8. The cutting insert according to claim 1, wherein each micro channel has a depth in the range of 20-1000 μm.

9. The cutting insert according to claim 1, wherein each micro channel has a depth of at least 50 μm.

10. The cutting insert according to claim 1, wherein each micro channel has a depth of 200 μm or less.

11. The cutting insert according to claim 1, wherein a distance between neighboring micro channels that do not intersect each other is at least 1.5 times the width of the respective micro channel.

12. The cutting insert according to claim 1, wherein the micro channels are at a distance k1 from the cutting edge, wherein 200 μm ≤ k1 ≤ 3 mm.

13. The cutting insert according to claim 12, wherein an intersection of the micro channels is at a distance k2 from the cutting edge, wherein k1 ≤ k2 ≤ k1+0.5 mm.

14. The cutting insert according to claim 1, wherein the outlets of the cooling channels have a diameter which is at least 3 times the width of the micro channels.

\* \* \* \* \*